United States Patent
Orup

[19]

[11] Patent Number: 5,974,432
[45] Date of Patent: Oct. 26, 1999

[54] ON-THE-FLY ONE-HOT ENCODING OF LEADING ZERO COUNT

[75] Inventor: Holger Orup, Austin, Tex.

[73] Assignee: Advanced Micro Devices, Inc., Sunnyvale, Calif.

[21] Appl. No.: 08/986,048

[22] Filed: Dec. 5, 1997

[51] Int. Cl.[6] .................................................. G06F 7/00
[52] U.S. Cl. ...................... 708/205; 708/211; 708/551; 708/553; 712/222
[58] Field of Search ............................ 395/563; 364/182, 364/715.04, 715.1, 745.02, 745.04, 748.01, 748.03; 712/222; 708/205, 211, 551, 553

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,926,369 | 5/1990 | Hokenek et al. . |
| 4,928,223 | 5/1990 | Dao et al. . |
| 4,941,120 | 7/1990 | Brown et al. ............................ 364/748 |
| 5,027,308 | 6/1991 | Site et al. ................................. 364/748 |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,204,825 | 4/1993 | Ng ..................................... 364/715.04 |
| 5,226,126 | 7/1993 | McFarland et al. . |
| 5,226,130 | 7/1993 | Favor et al. . |
| 5,627,773 | 5/1997 | Wolrich et al. ..................... 364/715.03 |
| 5,633,819 | 5/1997 | Brashears et al. ....................... 364/748 |
| 5,651,125 | 7/1997 | Witt et al. . |
| 5,694,350 | 12/1997 | Wolrich et al. ......................... 364/788 |
| 5,742,537 | 4/1998 | Wolrich et al. ..................... 364/748.05 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Suzuki, et al, "Leading–Zero Anticipatory Logic for High–Speed Floating Point Addition," IEEE Journal of Solid–State Circuits, vol. 31, No. 8, Aug. 1996, pp. 1157–1164.

Quach, et al, "Leading One Prediction—Implementation, Generalization, and Application," Technical Report, Computer Systems Laboratory, Mar. 1991, pp. 1–11.

Hokenek, et al, "Leading–zero anticipator (LZA) in the IBM RISC System/6000 floating–point execution unit," IBM Journal of Research and Development, vol. 34, No. 1, Jan. 1990, pp. 71–77.

(List continued on next page.)

*Primary Examiner*—Zarni Maung
*Assistant Examiner*—Saleh Najjar
*Attorney, Agent, or Firm*—Conley, Rose & Tayon, PC; B. Noel Kivlin

[57] ABSTRACT

A superscalar microprocessor including a floating point unit implements a floating point adder with a leading zero anticipator that predicts the number of leading zeros in the significand sum of the floating point adder. The leading zero anticipator outputs a control signal to a shifter to shift the sum of the significand adder to eliminate the leading zeros. The number of leading zeros is also provided to an exponent circuit that reduces the magnitude of the exponent to reflect the shifted significand. The leading zero anticipator includes a pattern generator that outputs an intermediate pattern with a number of leading zeros approximately equal to the number of leading zeros in the sum. A counter circuit counts the number of leading zeros and provides one or more one-hot control signals to the shifter. In one embodiment, the significand shifter implements two stages of one-hot multiplexers to provide the desired shift. The counter circuit outputs a one-hot course control signal to a first stage multiplexer and a one-hot fine control signal to a second stage multiplexer.

18 Claims, 10 Drawing Sheets

OTHER PUBLICATIONS

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

ON-THE-FLY ONE-HOT ENCODING OF LEADING ZERO COUNT

BACKGROUND OF THE INVENTION

1. Field of the Invention

This invention relates to the field of microprocessors and, more particularly, to the normalization of floating point numbers within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion.

Microprocessors are configured to operate upon various data types in response to various instructions. For example, certain instructions are defined to operate upon an integer data type. The bits representing an integer form the digits of the number. The binary point is assumed to be to the right of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the binary point, and the remaining bits to the right of the binary point. The bit to the left of the binary point is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) standard 754.

Floating point numbers can represent numbers within a much larger range than integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Floating point numbers are typically normalized such that the significand comprises one bit to the left of the binary point and the remaining bits to the right of the binary point. Normalization may be performed after an arithmetic function is performed on two normalized floating point numbers. For example, if a smaller floating point number subtracted from a larger floating point number, the result may have a number of leading zeros in the significand. To normalize the result, the significand is typically shifted such that the most significant digit of the significand is to the left of the binary point. At the same time, the exponent is reduced by the number of bit positions which the significand is shifted. Unfortunately, detecting the number of leading zeros of an arithmetic result and shifting the result introduces latency into the floating point operation. What is desired is an expedited apparatus and method of detecting the leading zeros of a significand and normalizing the significand.

SUMMARY OF THE INVENTION

The problems outlined above are in large part solved by a floating point adder in accordance with the present invention. The floating point adder includes a significand adder for adding and subtracting significands of floating point operands. The significand adder includes a leading zero anticipator which operates in parallel with a significand adder. The leading zero anticipator predicts the number of leading zeros of the result from the significand adder. The result from the significand adder is referred to herein as the significand sum. The leading zero anticipator preferably outputs a prediction of the number of leading zeros with less latency than the significand adder is able to derive the significand sum. The output of the leading zero anticipator is provided to a significand shift unit which shifts the significand a number of bits positions that approximately equals the number of leading zeros. The output of the leading zero anticipator may additionally be provided to a exponent unit which reduces the exponent by the number of bit positions which the significand is shifted.

In one embodiment, the leading zero anticipator predicts the number of leading zeros within one of the actual number of leading zeros. In one particular embodiment, the number of leading zeros predicted by the leading zero anticipator is either equal to the actual number of leading zeros or one less than the number of leading zeros. The floating point adder detects whether the significand sum needs to be shifted one more bit position at a later stage. In one embodiment, the significand shift unit includes one or more one-hot multiplexers. The inputs to the multiplexers are shifted versions of the significand sum. An output from the leading zero anticipator indicates which of the shifted versions to select as the output.

The leading zero anticipator outputs one or more one-hot control signals to the multiplexer that indicate which of the shifted inputs to provide as the output. In one particular embodiment, the significand shift unit includes a plurality of multiplexers. A first multiplexer shifts the significand by predefined multiples of a base number. The second multiplexer shifts the significand by numbers less than the predefined base. For example, a shift unit for shifting between 0 and 31 bit positions may have a predefined base of 8 and include a first multiplexer that shifts 0, 8, 16 or 24 bit positions. A second multiplexer may shift the output of the first multiplexer by 0 to 7 bit positions. To shift a significand 22 bit positions, the first multiplexer shifts the significand by 16 bit positions, and the second multiplexer shifts the output of the first multiplexer by 6 bit positions. In this manner, one large multiplexer may be replaced with two smaller multiplexers. By providing a one-hot control signal to the multiplexers of the shift unit, the latency of the shift unit may be reduced.

BRIEF DESCRIPTION OF THE DRAWINGS

Other objects and advantages of the invention will become apparent upon reading the following detailed description and upon reference to the accompanying drawings in which.

Figure 1:
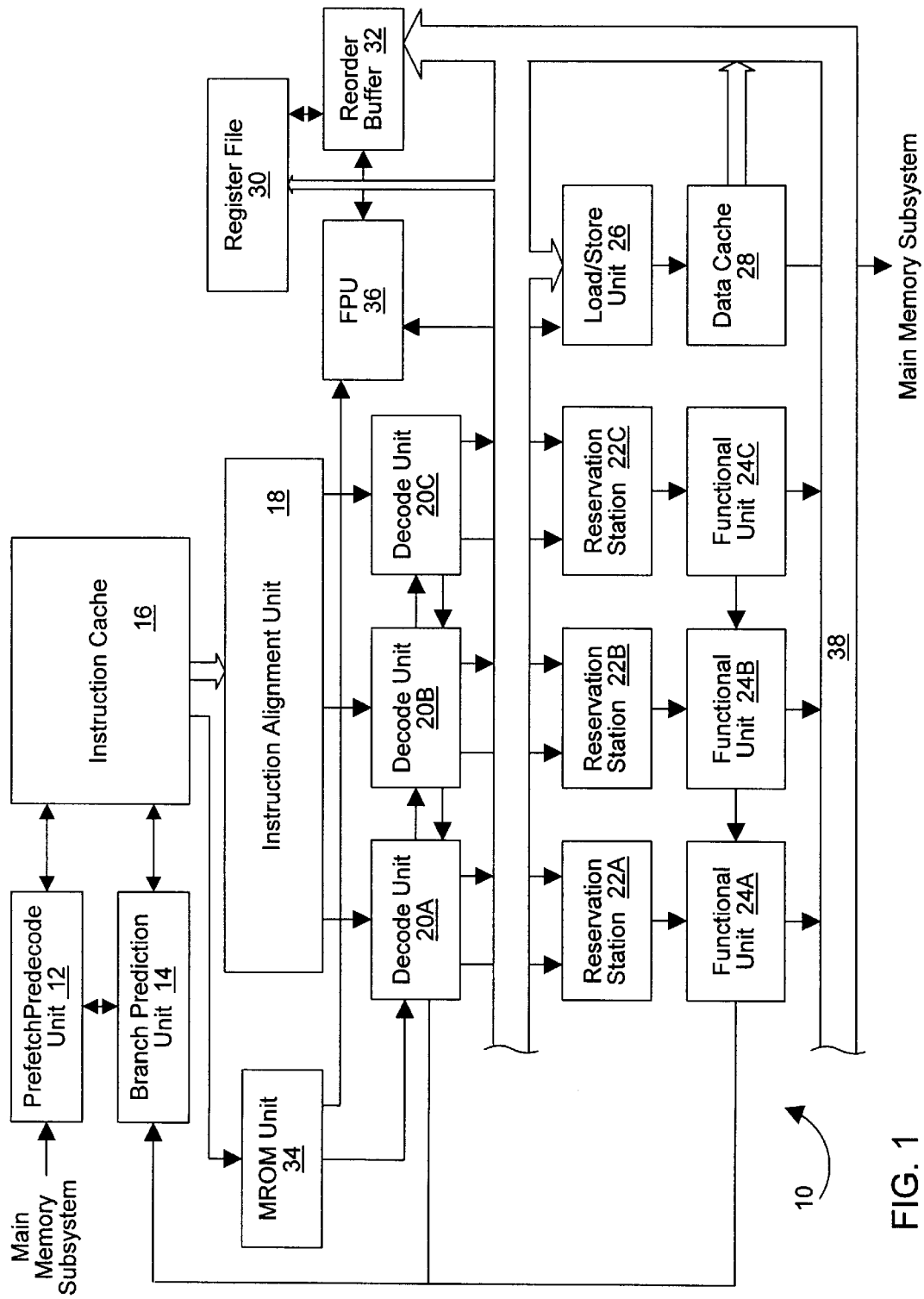
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM (microcode ROM) unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24.

Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer32.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 parses the floating point instruction into a floating point operation which is transmitted to floating point unit 36 and one or more load/store operations for load/store unit 26 to perform to retrieve memory operands for the instruction. FPU 36 executes the floating point instruction upon receipt of any memory operands. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

Instruction cache 16 is a high speed cache memory provided to store instructions.

Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which bare prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
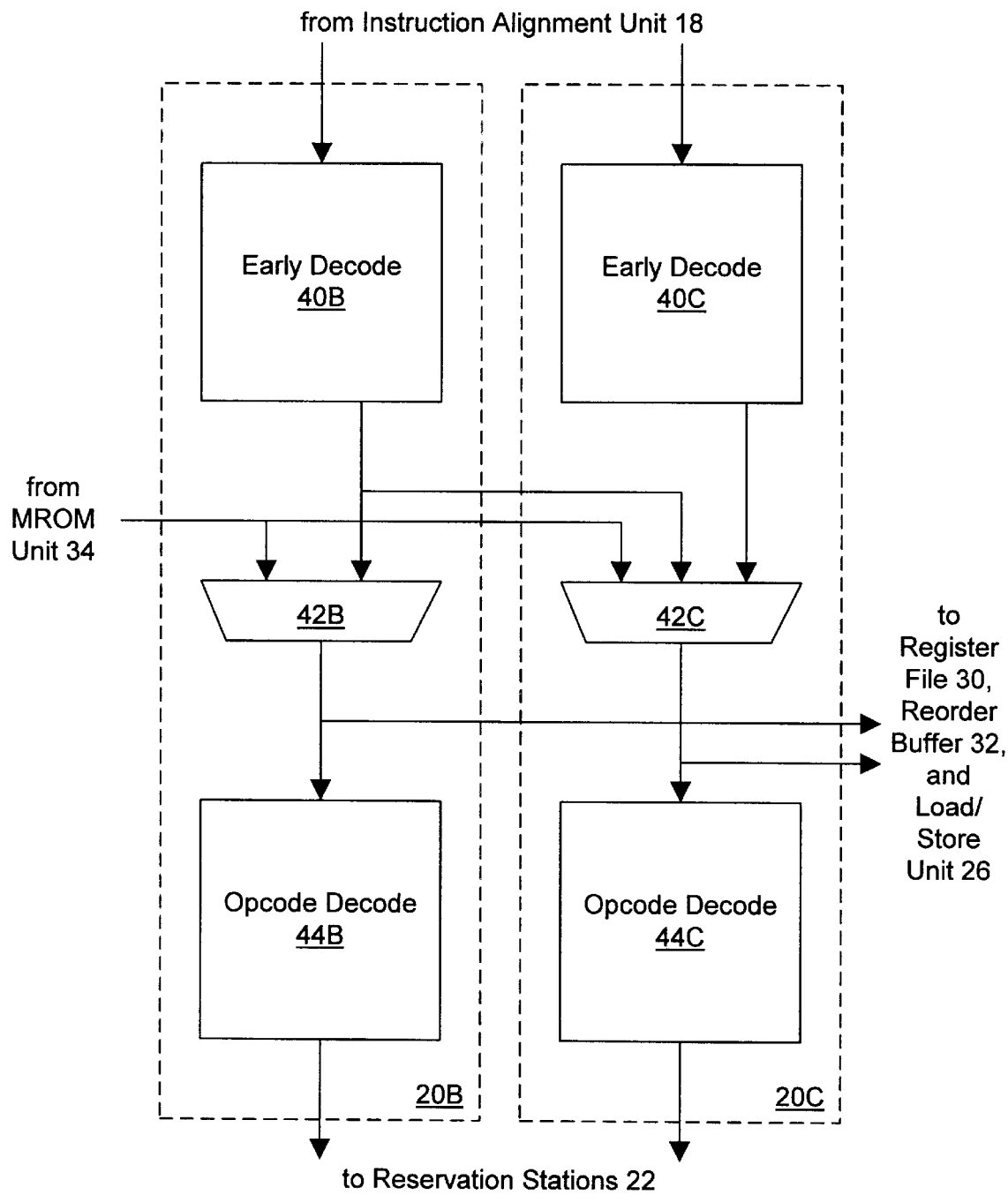
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
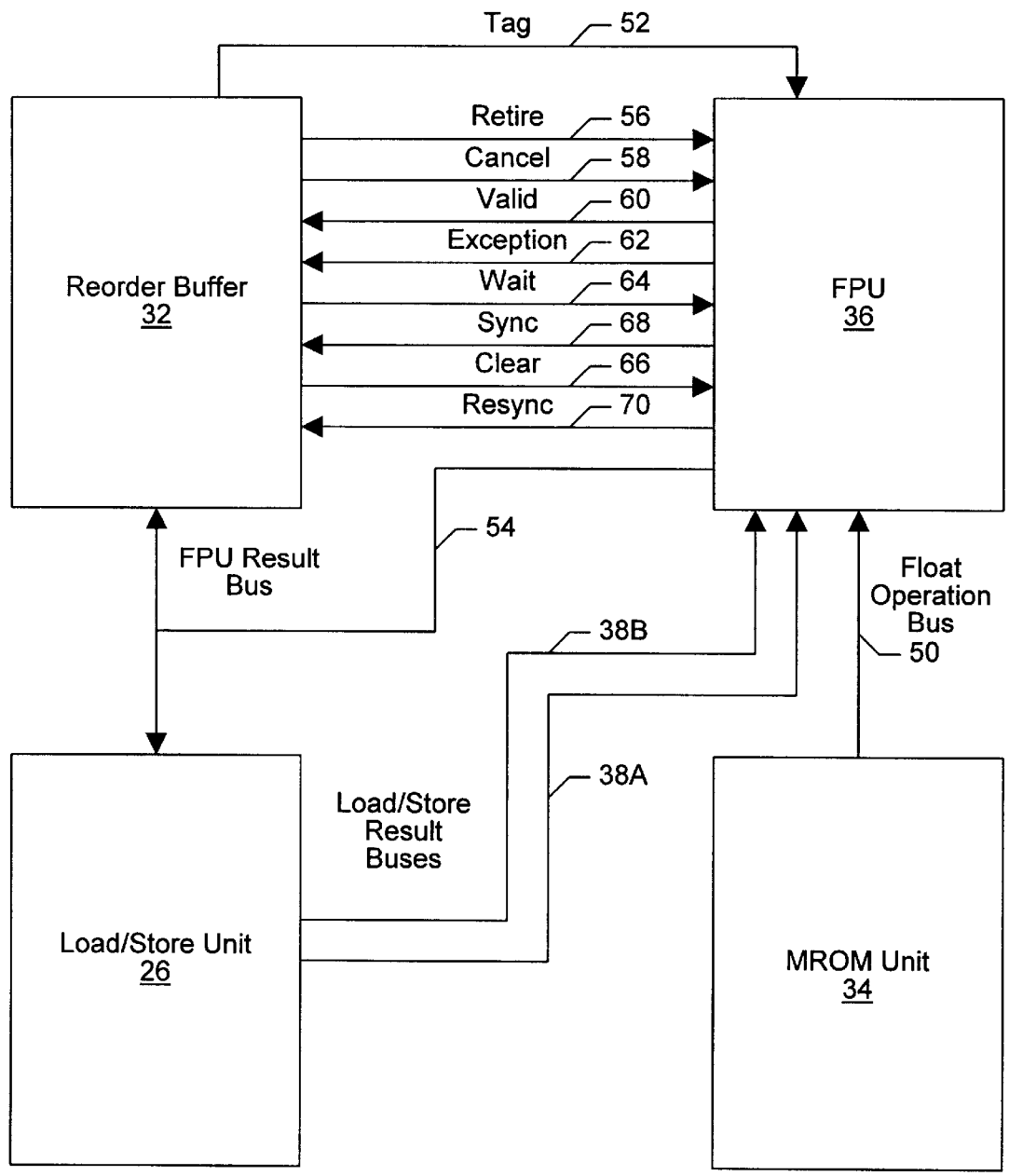
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU 36, and MROM unit 34 is shown. Interconnection between the blocks is highlighted in FIG. 3 according to one embodiment of microprocessor 10. Additional interconnection may be provided as desired according to design choice.

As mentioned above, MROM unit 34 receives floating point instructions from instruction cache 16 and parses the floating point instruction into a floating point operation and memory operations to retrieve and store memory operands for the instructions. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operation upon a float operation bus 50 coupled between MROM unit 34 and FPU 36. The floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

Load/store unit 26 provides memory operand data upon load/store result buses 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an interface between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked off).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer32. The foremost instruction within reorder buffer 32 is retired. The clear signal is used by reorder buffer 32 in a similar fashion: if the clear signal is asserted, FPU 36 deletes any speculative state stored therein.

Figure 4:
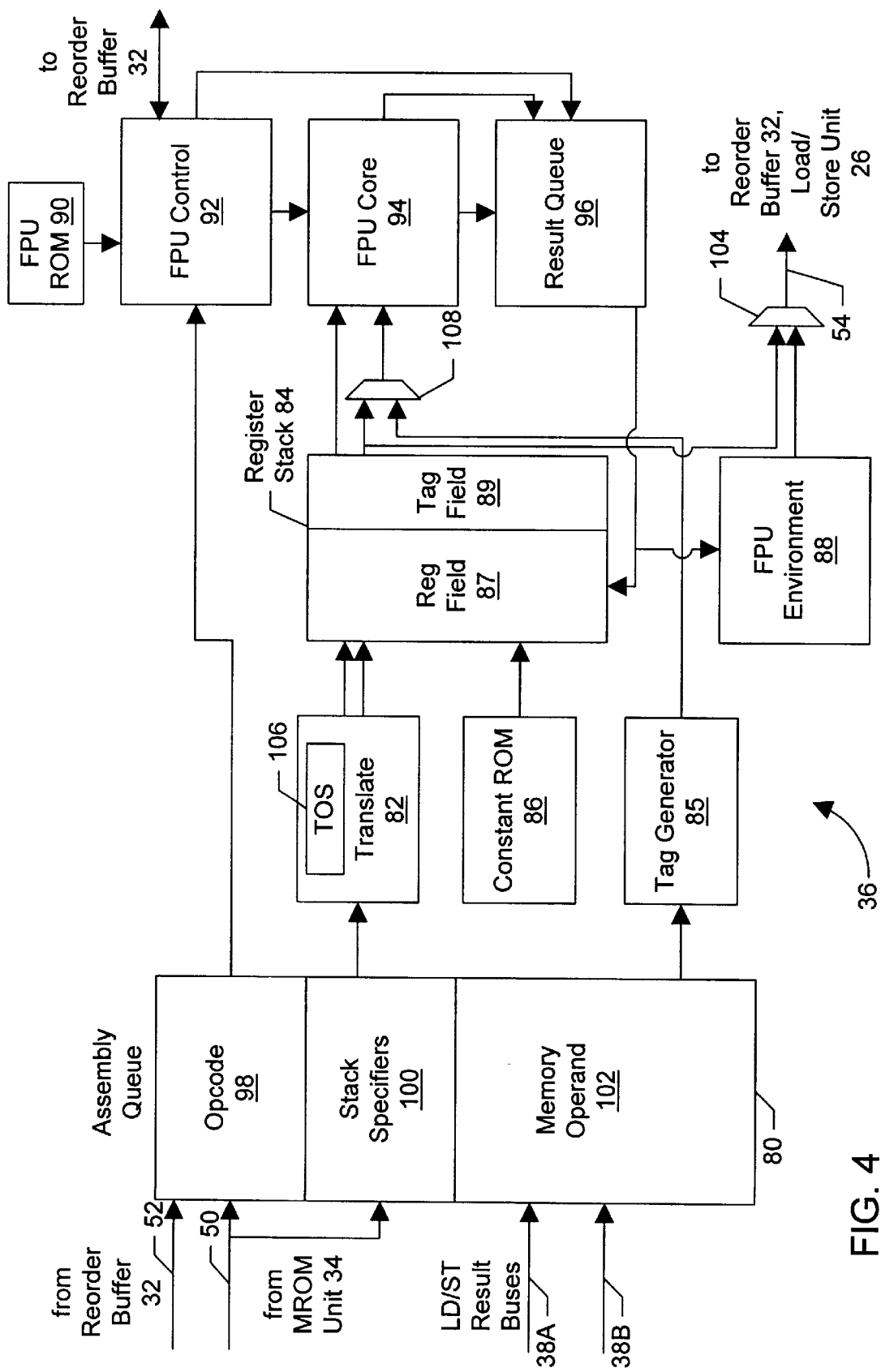
FIG. 4 is a block diagram of one embodiment of the floating point unit shown in FIG. 3.

Turning next to FIG. 4, a block diagram of one embodiment of FPU 36 is shown. As shown in FIG. 4, FPU 36 includes an assembly queue 80, and translate unit 82, a register stack 84, a constant read-only memory (ROM) 86, an FPU environment unit 88, an FPU ROM 90, an FPU control unit 92, an FPU core 94, and a result queue 96. Assembly queue 80 comprises multiple queue entries, each of which is configured to store instruction information corresponding to one instruction. As shown in FIG. 4, assembly queue 80 includes several fields for each entry. An opcode field 98 is included for storing the opcode of the floating point instruction and the corresponding reorder buffer tag, and a stack specifiers field 100 is included for storing register specifiers which select storage locations within register stack 84. The selected registers provide operands for the corresponding instructions. The values stored in opcode field 98 and stack specifier field 100 are received by FPU 36 upon float operation bus 50 from MROM unit 34 and tag bus 52 from reorder buffer32. Assembly queue 80 further includes a memory operand field 102 for storing a memory operand used by the instruction. The memory operand is received upon load/store result buses 38A and 38B.

Assembly queue 80 is coupled to FPU control unit 92 and to translate unit 82. Translate unit 82 is coupled to register stack 84, which is further coupled to constant ROM 86, result queue 96, and FPU core 94. FPU environment 88 is coupled to result queue 96 and is coupled to provide, through multiplexer 104, a result upon FPU result bus 54. Register stack 84 may also provide a result upon FPU result bus 54 through multiplexer 104. FPU control unit 92 is coupled to FPU ROM 90, result queue 96, and FPU core 94. FPU core 94 is further coupled to result queue 96. FPU control unit 92 is further coupled to receive the signals forming the interface between FPU 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instruction are stored into result queue 96. The results are held in result queue 96 until a retire indication is received from reorder buffer32. Upon receipt of the retire indication, the results are stored into register stack 84 (or FPU environment 88, if the destination of the instruction is an FPU environment register such as the control word or the status word).

When an instruction is dispatched into the execution pipeline, the stack specifiers for the instruction are conveyed to translate unit 82. In one embodiment, FPU 36 uses a stack-based register file in which one of the registers is defined to be the top of the stack. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is sometimes dependent upon the instructions which execute prior to that instruction (since these instructions may affect which register is the top of the stack). Translate unit 82 maps the stack specifiers to the registers within register stack 84 based upon a speculative top of stack value which reflects execution of the instructions prior to a particular instruction in program order (including the instructions still within the execution pipeline of FPU 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers.

Translate unit 82 provides the translated register specifiers to register stack 84, which reads the values from the corresponding register locations and provides the values to FPU core 94. The memory operand for the instruction may be substituted for one of the operands from register stack 84 via multiplexer 108. Register stack 84 includes the architected FPU registers defined by the microprocessor architecture employed by microprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

FPU core 94 includes the hardware used to manipulate the source operands of the floating point instruction in order to produce the result of the instruction. For example FPU core 94 may include a multiplier for multiplying the input operands, an adder for adding the input operands, etc. FPU core routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. Effectively, the transcendental instructions make multiple passes through the execution pipeline in order to complete. Intermediate results are calculated by the instructions within the microcoded routine, and the final result is formed by calculating upon the intermediate results.

The microcoded routines may make use of a set of constants stored in constant ROM 86. The constants stored in constant ROM 86 are useful in calculating results for the transcendental instructions. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register stack 84 and/or FPU environment 88 in program order. Alternatively, assembly queue 80 may operate similar to reservation stations 22 and result queue 96 may operate similar to reorder buffer32. In such an embodiment, FPU 36 may execute instructions out of order.

Figure 5:
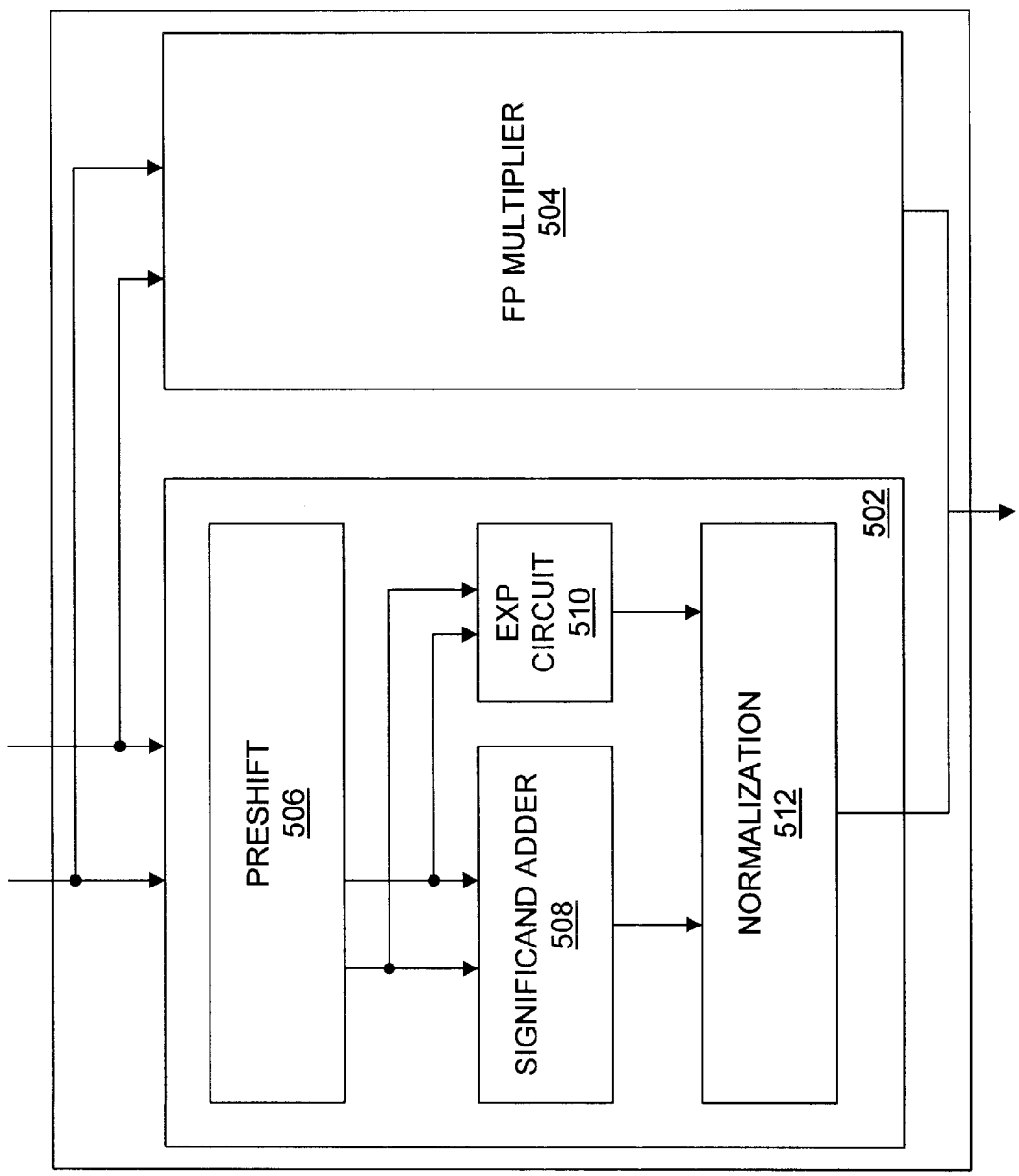
FIG. 5 is a simplified block diagram of a floating point core according to one embodiment of the present invention.

Turning now to FIG. 5, a simplified block diagram of floating point core 94 according to one embodiment of the present invention is shown. The components of floating core 94 necessary to understand the present invention are shown. Additional components of floating point core 94 not necessary to understanding the present invention are omitted for simplicity. In the illustrated embodiment, floating point core 94 includes a floating point adder 502 and a floating point multiplier 504. Floating point adder 502 performs floating point addition and subtraction functions. Floating point adder 502 receives floating point operands from register stack 84 and/or memory operand queue 102. Floating point adder 502 outputs floating point results to result queue 96. Floating point multiplier 504 performs floating point multiplication, division and transcendental operations. Floating point multiplier 504 receives floating point operands from register stack 84 and memory operand queue 102. Floating point multiplier 504 outputs floating point results to result queue 96.

Floating point adder 502 includes pre-shifter 506, significand adder 508, exponent circuit 510 and normalization unit 512. Pre-shifter 506 receives floating point operands from register stack 84 and/or memory operand queue 102. Each floating point operand includes a sign bit, a significand and a exponent. The output of pre-shifter 506 is coupled to significand adder 508 and exponent circuit 510. The output of significand adder 508 and the output of exponent circuit 510 is coupled to normalization circuit 512. A control signal from significand adder 508 is provided to exponent circuit 510.

Generally speaking, pre-shifter 506 receives two floating point operands. Pre-shifter 506 shifts one or more operands such that the exponent of the two operands are the same. For example, if pre-shifter 506 receives one floating point operand with an exponent value of 16 and another operand with and exponent value of 10, the significand of the latter operand is shifted six positions to the right and the exponent is increased by 6 to 16. In this manner, the exponents of the two operands are aligned such that the significands can be added or subtracted. The significands of the pre-shifted operands are provided to significand adder 508 and the exponents are provided to exponent circuit 510.

Significand adder 508 may add or subtract the significands depending upon the floating point operation. In one embodiment, significand adder 508 performs a floating point subtraction by adding the inverse of the second operand to the first operand. As discussed in more detail below, significand adder 508 adds, or subtracts, the two significands and normalizes the result to eliminate any leading zeros.

Exponent circuit 510 receives the exponents of the two operands from pre-shifter 506. Exponents circuit 510 additionally receives a control signal from significand adder 508 which specifies an amount to adjust the exponent of the result based upon the normalization of the significand result. For example, if significand adder 508 normalizes the result by left-shifting it two bit positions, exponent circuit 510 decreases the exponent value by two.

As discussed in more detail below, additional normalization may be required after the normalization of the significand result by significand adder 508. Accordingly, the output of significand adder 508 and exponent circuit 510 is provided to normalization circuit 512. Normalization circuit 512 performs any additional normalization necessary and outputs the floating point result to floating point result queue 96.

Figure 6:
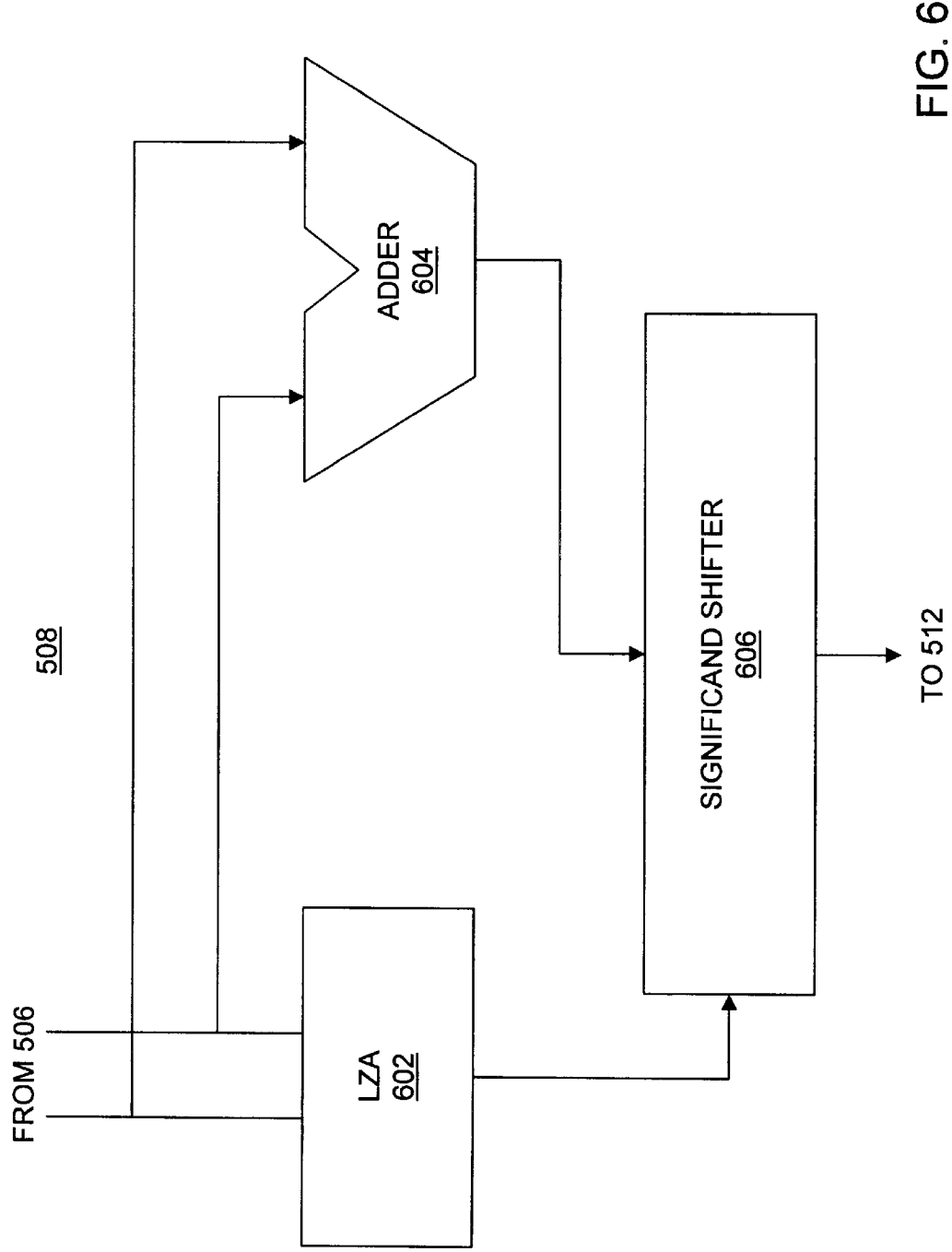
FIG. 6 is a block diagram of a significand adder according to one embodiment of the present invention.

Turning now to FIG. 6, a block diagram of significand adder 508 according to one embodiment of the present invention is shown. In the illustrated embodiment, significand adder 508 includes leading zero anticipator 602, adder 604 and significands shifter 606. Leading zero anticipator 602 receives the significands of the input operands from pre-shifter 506. Adder 604 additionally receives the significand of the input operands from pre-shifter 506. In one embodiment, pre-shifter 506 inverts the second operand before the floating substraction. Adder 604 is a conventional adder which adds the two input operands and provides a result to significand shifter 606. Leading zero anticipator 602 predicts the number of leading zeros in the result of the significand addition. Leading zeros in the significand addition may result when a positive number is added to the negative number. The resulting positive number may have less significant digits than the previous operand. Accordingly, the result may have one or more leading zeros. Leading zero anticipator 602 predicts the number of leading zeros in the significand sum in parallel with the addition operation. Leading zero anticipator 602 outputs a control signal to significand shifter 606 which shifts the result of the significand addition by the number of leading zeros predicted by leading zero anticipator 602. In this manner, the detection and normalization of the significand sum is expedited.

In one embodiment, significand shifter 606 expects a one-hot control signal from leading zero anticipator 602. In an alternative embodiment, significand shifter 606 may expect two or more one-hot control signals specified to the number of bit positions to shift the result of the significand addition. For example, significand shifter 606 may expect a course control signal that specifies the number of multiples of a predefined base to shift the result of the significand addition, and a fine control signal that specifies an additional number of bits to shift the output of the course shift. For example, the course control signal may specify a number of multiples of the predefined base of eight to shift the significand sum. In other words, the course control signal may specify to shift the significand sum by 0, 8, 16, 24, etc. bits. The fine control signal may then specify the number of bits between 0 and 7 to shift the output of the course adjustment. For example, shift the significand sum by 17 bits, the course control signal would specify a shift of two multiples of the base 8, or sixteen bit positions, and the fine control signal would specify an additional shift of 1 bit position. In this embodiment, significand shifter 606 includes a course multiplexer and a fine multiplexer. The course multiplexer receives the course control signal and shifts the significand sum by a multiple of the predefined base. The fine multiplexer is coupled to the fine control signal and shifts the output of the course multiplexer by an additional number of bit positions specified by the fine control signal.

Figure 7:
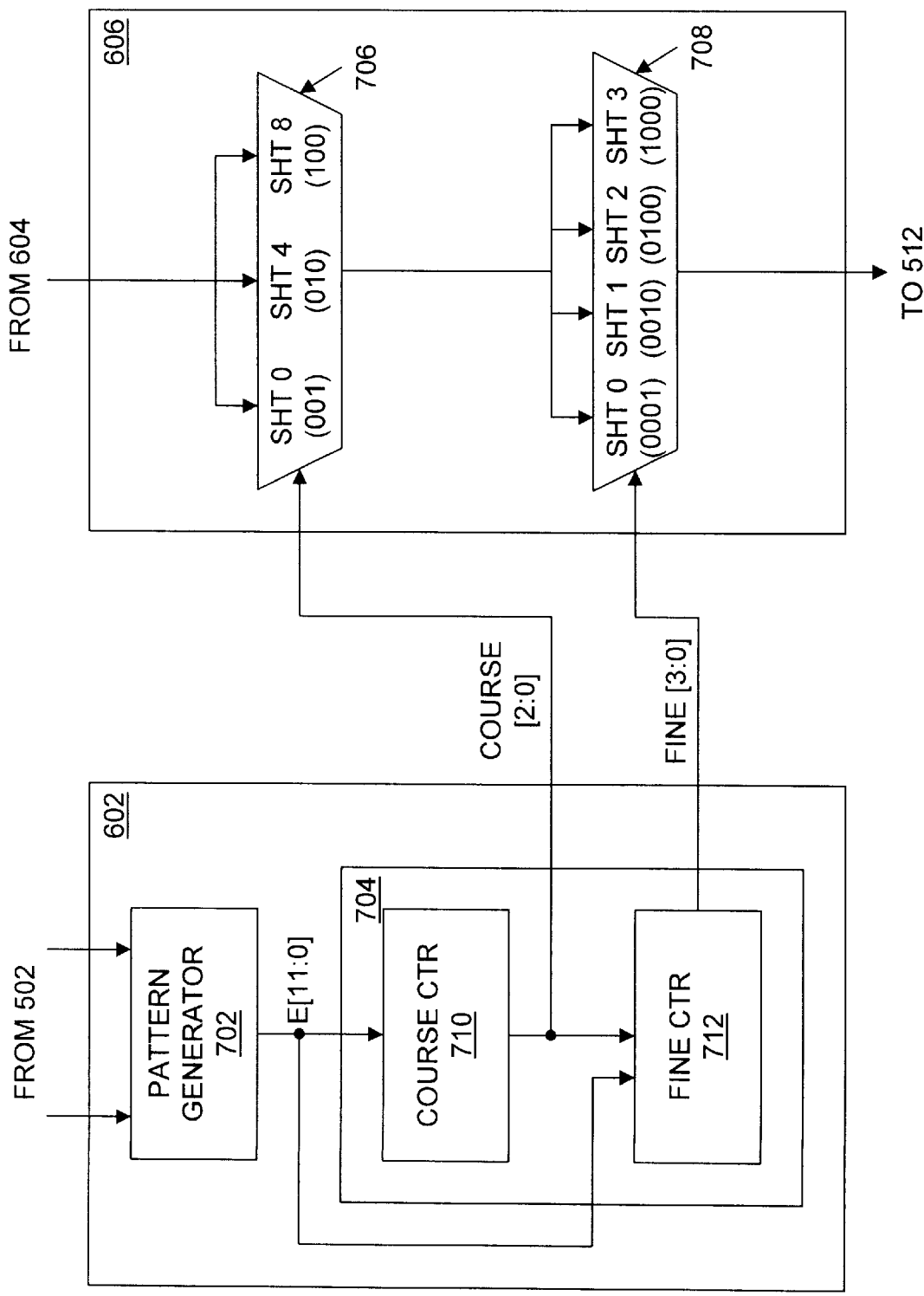
FIG. 7 is a block diagram of a leading zero anticipator and a significand shifter according to one embodiment of the present invention.

Turning now to FIG. 7, a block diagram of leading zero anticipator 602 and significand shifter 606 is shown according to one embodiment of the present invention. In the illustrated, leading zero anticipator includes pattern generator 702 and counter 704. Significand shifter 606 includes course multiplexer 706 and fine multiplexer 708. Pattern generator 702 receives the significands of two input operands and outputs an intermediate bit pattern (E) with a number of leading zeros approximately equal to the number of leading zeros in the result of the addition of the two operands. Counter 704 counts the number of leading zeros in the intermediate bit pattern and outputs one or more control signals to significand shifter 606. In the illustrated embodiment, counter 704 outputs a course control signal and a fine control signal to significand shifter 606.

Significand shifter 606 may include one or more multiplexers for shifting the result of the significand addition. In the illustrated embodiment, significand shifter 606 includes course multiplexer 706 and fine multiplexer 708. Course multiplexer 706 is coupled to the output of significand adder 604. The output of course multiplexer 706 is coupled to the input of fine multiplexer 708. The output of fine multiplexer 708 is output to normalization circuit 512. Course multiplexer 706 is coupled to the course control signal from counter 704 and fine multiplexer 708 is coupled to the fine control signal from counter 704.

Generally speaking, course multiplexer 706 shifts the significand sum by a multiple of a predefined base. In the illustrated embodiment, significand shifter 606 is designed to shift the significand sum by 0–11 bit positions and the predefined base is 4. Course multiplexer 706 shifts the output of significand adder 604 by either 0, 4 or 8 bit positions. Fine multiplexer 708 shifts the output of course multiplexer 706 by 0, 1, 2 or 3 bit positions. Counter 704 provides a three-bit one-hot control signal to course multiplexer 706 and a four-bit one-hot control signal to fine multiplexer 708.

In other embodiments, significand shifter 606 may include additional multiplexers or larger multiplexers for shifting additional bit positions. For example, to shift up to 71 bit positions, a base of eight may be chosen and course multiplexer 706 may select one of nine different shifted multiples of the base (0, 8, 16, 24, 32, 40, 48, 56 or 64 bit positions). In this embodiment, fine multiplexer 708 may select one of eight different shifted outputs of course multiplexer 706 (0, 1, 2, 3, 4, 5, 6 or 7 bit positions). In this embodiment, the course control signal is a nine-bit one-hot control signal and the fine control signal is an eight-bit one-hot control signal. In an alternative embodiment, significand shifter 606 may include three or more multiplexers. For example, the shift operation may be performed by three multiplexers. A first multiplexer with a base of 16 may shift the significand sum by 0, 16, 32, 48 or 64 bit positions. A second multiplexer with a base of 4 may shift the output of the first multiplexer by 0, 4, 8 or 12 bit positions. A third multiplexer may shift the output of the second multiplexer by 0, 1, 2 or 3 bit positions. Shifting up to 71 bit positions also may be accomplished with one 72-input multiplexer and a 72 bit one-hot control signal. The 72-input multiplexer requires substantially more circuitry but may reduce the latency of the shift operation. The additional latency of the two multiplexer significand shifters may be reduced by generating the course control signal prior to the fine control signal. In this manner, the course selection may occur during the generation of the fine control signal and the latency of the course multiplexer is hidden in the generation latency of the fine control signal. In still other embodiments, additional levels and different size multiplexers may be used.

As discussed above, pattern generator 702 predicts the number of leading zeros of significand sum. The output of pattern generator 702 is an intermediate bit pattern with a number of leading zeros equal to the number of leading zeros in the result of the significand addition or one less than the number of leading zeros in the significand addition. The circuitry after leading zero anticipator 602 can detect if the resulting significand is not fully normalized by doing a simple inspection of the most significant bit. An additional one-bit left shift may be required before the sum is completely normalized. This same correction mechanism may be used to left shift the significand if the addition to two positive operands does not generate a carry-out. To take advantage of leading zero anticipator 602, it is necessary for pattern generator 702 to output the intermediate bit pattern in less time than the actual sum is available from adder 604.

The basic functionality of leading zero anticipator 602 includes two steps. In the first step, an intermediate bit pattern E is generated from the operands A and B. The bit pattern E is generated such that the number of leading zeros in the significand sum is at most one more than the number of leading zeros in the bit pattern E. In the second step, the number of leading zeros in the bit pattern E is counted. The count is provided to significand shifter 606 in a one-hot format to expedite the shifting, or multiplexing, of the result.

The bit pattern E is generated from three derivative bit patterns. The derivative bit patterns are derived by a bit-wise ANDing, exclusive ORing and NORing of the bits of the input operands. Each bit position is either assigned the value G, P or Z depending upon whether the number of asserted bits is 0, 1 or 2. If both bits in a bit position are unasserted, the bit position is classified as Z. If one and only one bit in a bit position is asserted, the bit position is classified as P. If both bits in a bit position are asserted, the bit position is classified as G. The following example showed the classification of the bit positions of the sum of operand A=1425 and B=−1403:

| A = | 0 | 1 | 0 | 1 | 1 | 0 | 0 | 1 | 0 | 0 | 0 | 1 |
|-----|---|---|---|---|---|---|---|---|---|---|---|---|
| B = | 1 | 0 | 1 | 0 | 1 | 0 | 0 | 0 | 0 | 1 | 0 | 1 |
|     | P | P | P | P | G | Z | Z | P | Z | P | Z | G |

In one embodiment, operand A will always be a positive normalized number and operand B will always be smaller than or equal the magnitude of operand B. Accordingly, the resulting significand will always be non-negative. The special case where both A and B are zero is handled elsewhere and is not handled by leading zero anticipator 602. Because the resulting sum is always positive, the characterizing string of two opposite signed values of A and B will have a prefix of the form $P^{30}GZ^*$. $P^{30}$ refers to a string of one or more P symbols, and $Z^*$ refers to zero or more Z symbols. The number of leading zeros in the result of the significand addition is equal to the length of this prefix or it is equal to the length of the prefix minus 1. All pairs of operands with opposite signs have a prefix of the same form ($P^+GZ^*$). The intermediate bit pattern E is constructed such that the most-significant asserted bit marks the end of the prefix. Accordingly, the number of leading zeros in E is either equal to the number of leading zeros in the sum or one less than the number of leading zeros in the sum. The end of the prefix of the E string is identified by the first occurrence of either Z~Z or G~Z. This corresponds to the first occurrence of ~P~Z. The following examples shows the intermediate bit pattern E for the above sequence of G, P and Z (the least significand bit position is always asserted):

|     | P | P | P | P | G | Z | Z | P | Z | P | Z | G |
|-----|---|---|---|---|---|---|---|---|---|---|---|---|
| E = | 0 | 0 | 0 | 0 | 0 | 0 | 1 | 0 | 1 | 0 | 1 | 1 |

In the above example, the length of the prefix is seven, which is equal to the number of leading zeros in the sum of 1425 and −1403. The number of leading zeros in the bit pattern E is six, which is one less than the number of leading zeros in the result.

The intermediate bit pattern E is output to counter 704 which counts the number of leading zeros and provides control signals to significand shifter 606. The configuration of counter 704 depends upon the design of significand shifter 606. In the illustrated embodiment, counter 704 outputs a course control signal to course multiplexer 706 of significand shifter 606 and a fine control signal to fine multiplexer 708 of significand shifter 606. In this embodiment, counter 704 includes a course counter 710 and a fine counter 712. Course counter 710 outputs a one-hot control signal to course multiplexer 706 and fine counter 712 outputs a one-hot control signal to fine multiplexer 708. In other embodiments, counter 704 may provide different control signals to significand shifter 606. Leading zero anticipators are discussed in more detail in U.S. Pat. No. 4,926,369 to Hokenek and Montoye, which is herein incorporated by referenced in its entirety.

Figure 8:
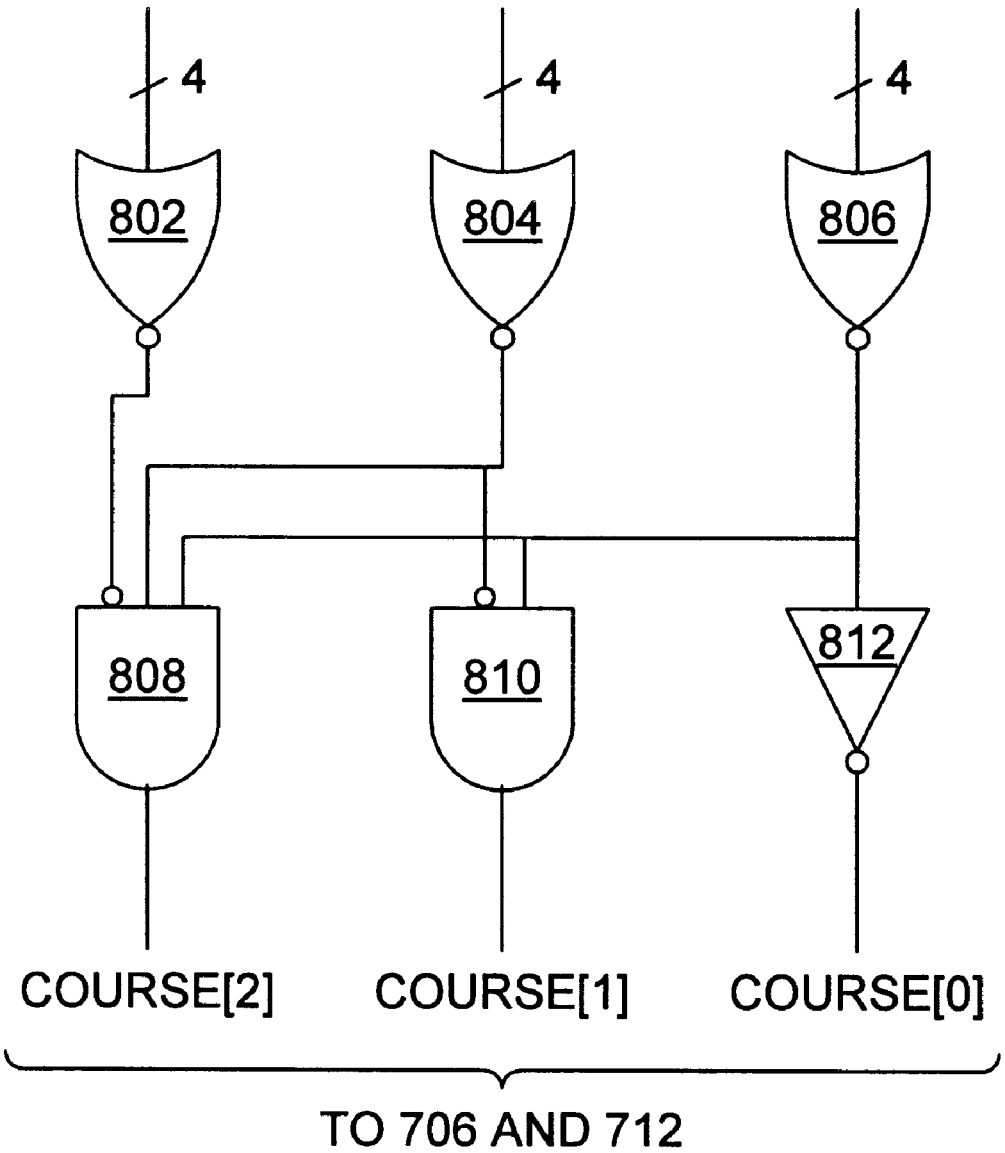
FIG. 8 is a logic diagram of a course counter according to one embodiment of the present invention.

Turning now to FIG. 8, a logic diagram of course counter 710 according to one embodiment of the present invention is shown. Course counter 710 includes NOR gates 802, 804 and 806, AND gates 808 and 810 and inverter 812. Generally speaking, course counter 710 divides the bit pattern E into three groups of four bits. Course counter 710 detects which of the groups include all unasserted bits and which of the groups include one or more asserted bits. Course counter 710 outputs a one-hot control signal identifying the most significant group of bits with at least one asserted bit. Only one bit of the course control signal is typically asserted. The one asserted bit of the control signal asserted identifies which shifted version of the sum course multiplexer 706 outputs. It is noted, that other circuits may accomplish the substantially same function. It is further noted, that the polarities may be reversed and equivalent circuits derived for the opposite polarity.

The E signal is divided into three groups of 4 bits (E[11:8], E[7:4] and E[3:0]). Each group of bits is provided to a NOR gate. The output of NOR gate 802 is asserted if the least significant group of bits are all unasserted. In a similar manner, the output of NOR gate 804 is asserted if the second least significant group of bits are all unasserted, and the output of NOR gate 806 is asserted if the most significant group of bits are all unasserted.

As discussed above, course counter 710 outputs a one-hot control signal identifying the most significant group of bit in which at least one bit is asserted. AND gate 808 is coupled to the inverted output of NOR gate 802, the output of NOR gate 804 and the output of NOR gate 806. The output of AND gate 808 is asserted if the two most significant groups of bits include all unasserted bits and the least significant group of bits includes at least one asserted bit. The output of AND gate 808 is the most significant bit of the one-hot course control signal provided to course multiplexer 706 and causes course multiplexer 706 to shift the significand sum 8 bit positions. AND gate 810 is coupled to the inverted output of NOR gate 804 and the output of NOR gate 806. The output of AND gate 810 is asserted if the most significant group of bits is all zero and the second most significant group of bits includes at least one asserted bit. The output of AND gate 810 is the second most significant bit of the one-hot control signal provided to course multiplexer 706 and causes course multiplexer 706 to shift the sum 4 bit positions. Inverter 812 is coupled to the output of NOR gate 806. The output of inverter 812 is asserted if the most significant group of bits includes at least one asserted bit. The output of inverter 812 is the least significant bit of the course control signal and causes multiplexer 706 to output an unshifted version of the sum. The course control signal is additionally provided to fine counter 712.

Figure 9:
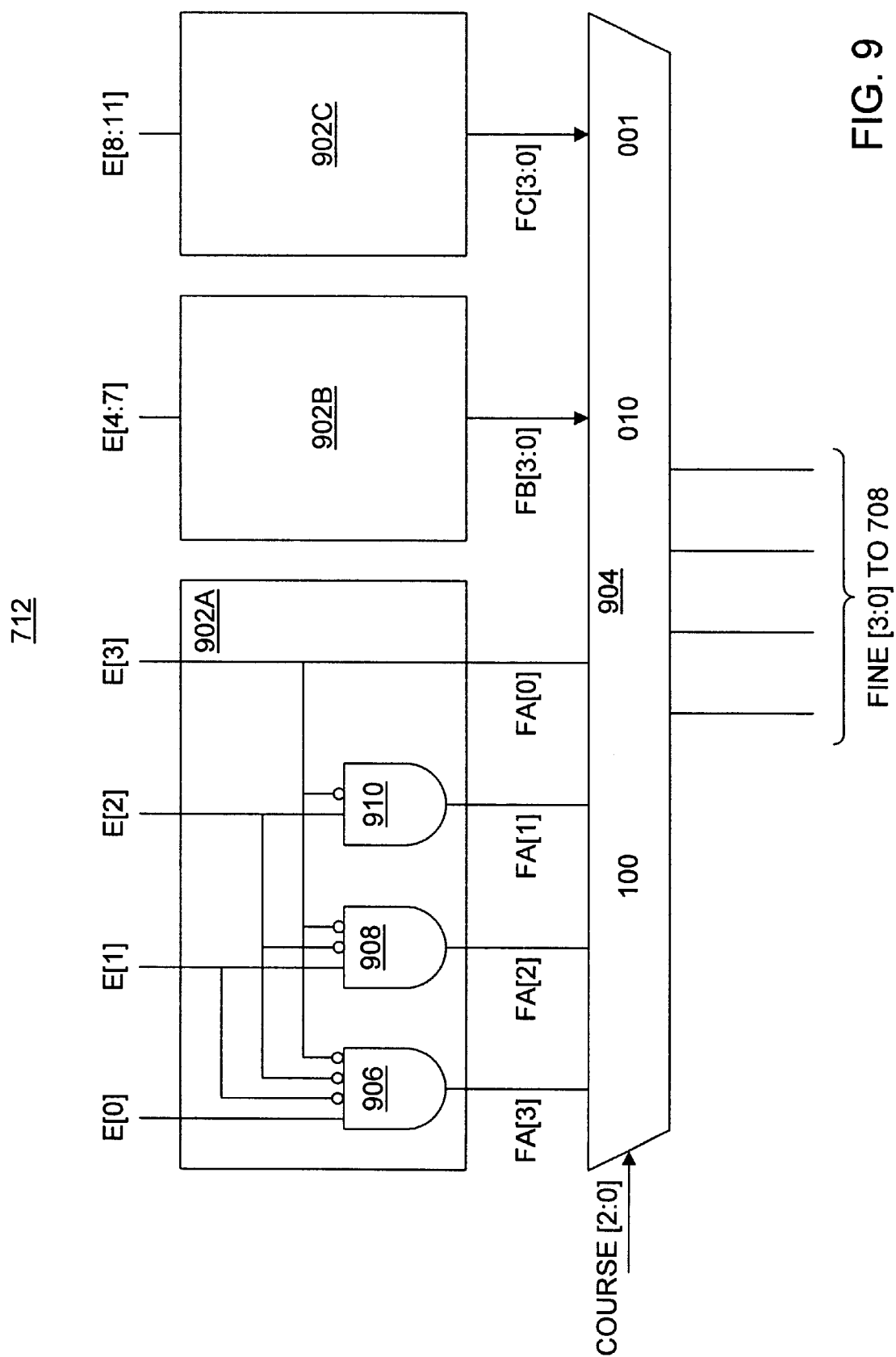
FIG. 9 is a logic diagram of a fine counter according to one embodiment of the present invention.

Turning now to FIG. 9, a logic diagram of fine counter 712 is shown according to one embodiment of the present invention. In the illustrated embodiment, fine counter 712 includes priority detectors 902A, 902B and 902C, and multiplexer 904. Generally speaking, the E signal is divided into three groups of four bits: E[11:8], E[7:4] and E[3:0] (E[11] refers to the most significant bit of the E signal and E[0] refers to the least significant bit of the E signal). Priority detectors 902A–902C detect the first asserted bit within each group of bits of the E signal. Multiplexer 904 outputs one prioritized group of bits in dependence upon the course control signal from course counter 710. The course control signal indicates which of the groups of bits is the most significant group with one or more asserted bits. The priority signal for that group of bits is selected as the fine control signal by multiplexer 904.

Priority circuit 902A includes AND gate(s) 906, 908 and 910. AND gate 906 is coupled to the least significant bit of the group of input bits (E[0]), the inverse of the second least significant bit (E[1]), the inverse of the third least significant input bit (E[2]) and the inverse of the most significant of the group of input bit (E[3]). The output of AND gate 906 is asserted if the least significant bit of the group of input bits is asserted and the remaining bits are unasserted. The output of AND gate 906 is the most significant bit of the priority signal provided to a first input of multiplexer 904. AND gate 908 is coupled to the second least significant bit (E[1]), the inverse of the third least significant bit (E[2]) and the inverse of the most significant bit (E[3]). The output of AND gate 908 is asserted if the two most significant bits of the group are unasserted and the third most significant bit is asserted. The output of AND gate 908 provides the second most significant bit of the first input to multiplexer 904. AND gate 910 is coupled to the second most significant bit of the group of bits (E[2]), and the inverse of the most significant bit of the group of bits (E[3]). The output of AND gate 910 is asserted if the most significant bit is unasserted and the second most significant bit is asserted. The output of AND gate 910 is the third most significant bit of the first input to multiplexer 904. The least significant bit of the first input of multiplexer 904 is coupled to the most significant bit of the group of input bits (E[3]).

Priority detectors 902B and 902C operate in substantially the same manner as described above in reference to priority detector 902A. Each prioritized output of the priority detectors is provided to one input of multiplexer 904. As discussed above, multiplexer 904 selects one of the outputs of the priority detectors based upon the course control signal, which identifies the most significant group of bits that includes at least one asserted bit. In one embodiment, the generation of the fine control signal is done in parallel with the selection of course multiplexer 706 to reduce the latency of floating point adder 502.

If the most significant bit of the fine control signal is asserted, fine multiplexer 708 outputs a version of the sum shifted by 3 bits positions. If the second most significant bit of the fine control signal is asserted, fine multiplexer 708 outputs a version of the sum shifted by 2 bit positions. If the third most significant bit of the fine control signal is asserted, fine multiplexer outputs a version of the sum shifted by 1 bit position. If the least significant bit of the fine control signal is asserted, fine multiplexer outputs an unshifted version of the sum.

It is noted that the embodiment of counter 704 discussed above depends upon the configuration of significand shifter 606. The same principals may be used to design a counter for a variety of shifter configurations.

Figure 10:
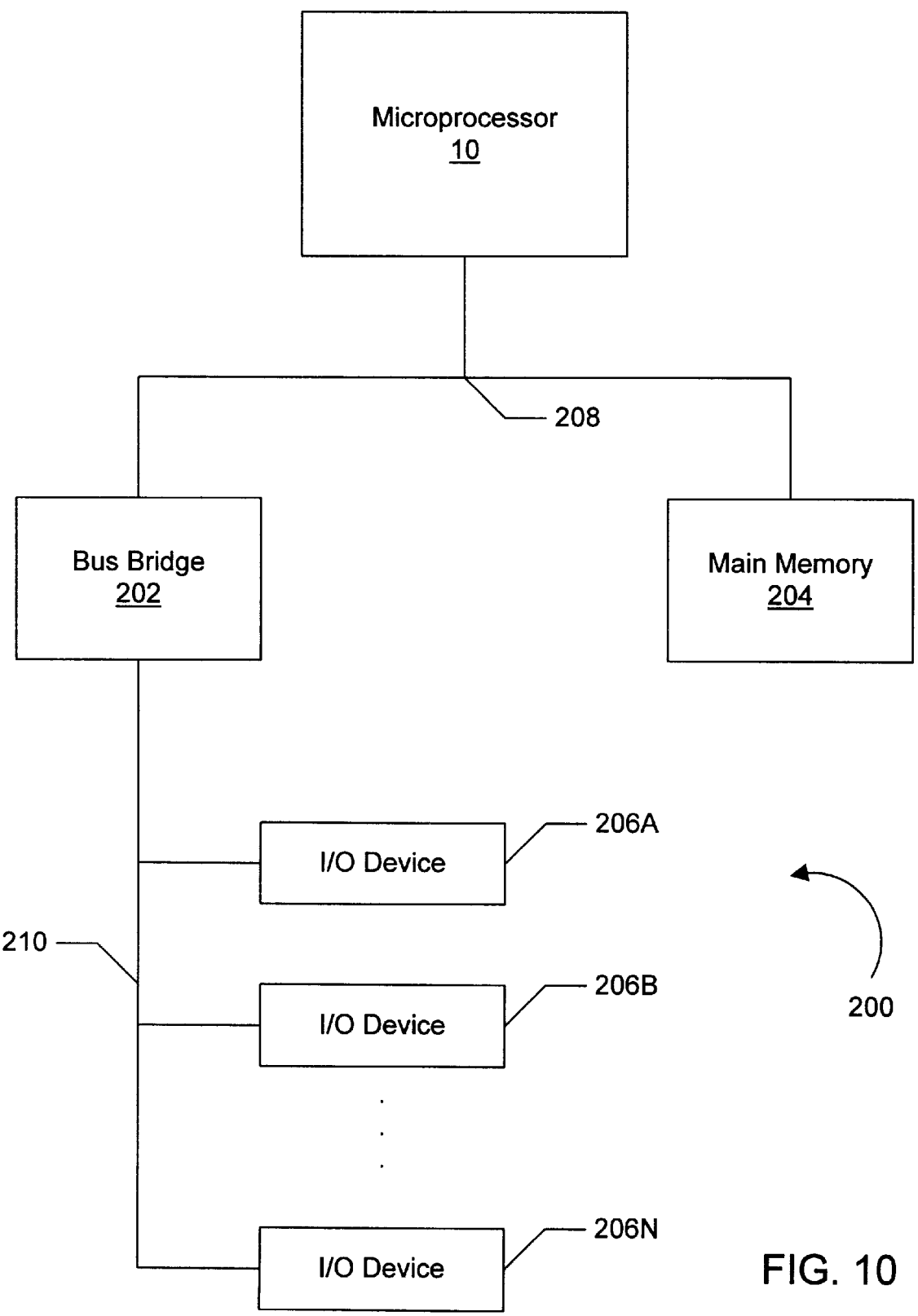
FIG. 10 is a block diagram of a computer system including the microprocessor of FIG. 1

Turning now to FIG. 10, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 10 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. In a floating point adder, a significand adder comprising:

an adder circuit configured to generate a signficand sum upon addition of a first significand from a first floating point operand and a second signficand from a second floating point operand;

a leading zero anticipator including:

a pattern generator configured to receive said first and said second significands as inputs and to output an intermediate bit pattern with a first number of leading zeros approximately equal to a second number of leading zeros in said significand sum, a plurality of counters coupled to said pattern generator, wherein each of said plurality of counters is configured to count a corresponding number of leading zeros contained in said first number of leading zeros and to output a corresponding one-hot control signal indicative of said corresponding number of leading zeros, wherein an addition of each of said corresponding number of leading zeros equals said first number of leading zeros, and wherein each of said corresponding one-hot control signal is generated in succession; and a significand shifter coupled to said leading zero anticipator to receive said each of said corresponding one-hot control signal therefrom, wherein said significand shifter is further coupled to said adder circuit to receive said significand sum, wherein said significand shifter is configured to select a corresponding one of a plurality of shifted versions of said significand sum in dependence upon said each of said corresponding one-hot control signal received in succession, thereby finally generating a first normalized significand sum.

2. The significand adder according to claim 1, wherein said first number of leading zeros is equal to or one less than said second number of leading zeros.

3. The significand adder as in claim 2, further comprising a one-bit shifter coupled to receive said first normalized significand sum and to generate a second normalized significand sum therefrom by shifting said first normalized significand sum when said first number of leading zeros is one less than said second number of leading zeros.

4. The significand adder of claim 1, wherein said significand shifter includes a plurality of one-hot multiplexers equal in number to said plurality of counters, wherein each of said plurality of one-hot multiplexers is coupled to only one of said plurality of counters to receive said corresponding one-hot control signal as a select input.

5. The significand adder according to claim 4, wherein said plurality of counters includes:

a first counter configured to output a first one-hot control signal indicative of a first corresponding number of leading zeros according to a first base number, and a second counter configured to output a second one-hot control signal indicative of a second corresponding number of leading zeros according to a second base number, wherein said second base number is less than said first base number, and wherein said plurality of one-hot multiplexers includes:

a first one-hot multiplexer configured to receive said significand sum from said adder circuit and to generate an output by shifting said significand sum a first multiple of said first base number in dependence upon said first one-hot control signal, wherein said first multiple of said first base number equals said first corresponding number of leading zeros, and a second one-hot multiplexer configured to receive said output from said first one-hot multiplexer and to generate said first normalized significand sum by shifting said output a second multiple of said second base number in dependence upon said second one-hot control signal, wherein said second multiple of said second base number equals said second corresponding number of leading zeros.

6. The significand adder as in claim 5, wherein said first base number is an integer multiple of said second base number.

7. The significand adder of claim 4, wherein said plurality of one-hot multiplexers includes:

a first one-hot multiplexer configured to make a course shift of said significand sum in dependence upon a first corresponding one-hot control signal; and a second one-hot multiplexer configured to make a fine shift of an output of said first one-hot multiplexer in dependence upon a second corresponding one-hot control signal.

8. A microprocessor comprising:

an instruction cache;

an instruction alignment unit coupled to said instruction cache;

a decode unit coupled to said instruction alignment unit;

a functional unit coupled to said decode unit;

a microcode unit coupled to said instruction cache and said decode unit; and a floating point unit coupled to said microcode unit, wherein said floating point unit includes a significand adder comprising:

an adder circuit configured to generate a signficand sum upon addition of a first significand from a first floating point operand and a second signficand from a second floating point operand;

a leading zero anticipator including:

a pattern generator configured to receive said first and said second significands as inputs and to output an intermediate bit pattern with a first number of leading zeros approximately equal to a second number of leading zeros in said significand sum, a plurality of counters coupled to said pattern generator, wherein each of said plurality of counters is configured to count a corresponding number of leading zeros contained in said first number of leading zeros and to output a corresponding one-hot control signal indicative of said corresponding number of leading zeros, wherein an addition of each of said corresponding number of leading zeros equals said first number of leading zeros, and wherein each of said corresponding one-hot control signal is generated in succession; and a significand shifter coupled to said leading zero anticipator to receive said each of said corresponding one-hot control signal therefrom, wherein said significand shifter is further coupled to said adder circuit to receive said significand sum, wherein said significand shifter is configured to select a corresponding one of a plurality of shifted versions of said significand sum in dependence upon said each of said corresponding one-hot control signal received in succession, thereby finally generating a first normalized significand sum.

9. The microprocessor according to claim 8, wherein said first number of leading zeros is equal to or one less than said second number of leading zeros.

10. The microprocessor as in claim 9, further comprising a one-bit shifter coupled to receive said first normalized significand sum and to generate a second normalized significand sum therefrom by shifting said first normalized significand sum when said first number of leading zeros is one less than said second number of leading zeros.

11. The microprocessor of claim 8, wherein said significand shifter includes a plurality of one-hot multiplexers equal in number to said plurality of counters, wherein each of said plurality of one-hot multiplexers is coupled to only one of said plurality of counters to receive said corresponding one-hot control signal as a select input.

12. The microprocessor according to claim 11, wherein said plurality of counters includes:

a first counter configured to output a first one-hot control signal indicative of a first corresponding number of leading zeros according to a first base number, and a second counter configured to output a second one-hot control signal indicative of a second corresponding number of leading zeros according to a second base number, wherein said second base number is less than said first base number, and wherein said plurality of one-hot multiplexers includes:

a first one-hot multiplexer configured to receive said significand sum from said adder circuit and to generate an output by shifting said significand sum a first multiple of said first base number in dependence upon said first one-hot control signal, wherein said first multiple of said first base number equals said first corresponding number of leading zeros, and a second one-hot multiplexer configured to receive said output from said first one-hot multiplexer and to generate said first normalized significand sum by shifting said output a second multiple of said second base number in dependence upon said second one-hot control signal, wherein said second multiple of said second base number equals said second corresponding number of leading zeros.

13. The microprocessor as in claim 12, wherein said first base number is an integer multiple of said second base number.

14. The microprocessor of claim 11, wherein said plurality of one-hot multiplexers includes:

a first one-hot multiplexer configured to make a course shift of said significand sum in dependence upon a first corresponding one-hot control signal; and a second one-hot multiplexer configured to make a fine shift of an output of said first one-hot multiplexer in dependence upon a second corresponding one-hot control signal.

15. A method of normalizing a floating point number comprising:

(a) predicting a number of leading zeros of a significand sum concurrently with computing said significand sum;

(b) counting through a plurality of counters and in a descending order a plurality of non-overlapping subsets of said predicted number of leading zeros, wherein each of said plurality of subsets includes said leading zeros equal in number to a corresponding multiple of a corresponding base number;

(c) generating in response to said counting in step (b) a plurality of one-hot control signals corresponding in number to said plurality of non-overlapping subsets, wherein each of said plurality of one-hot control signals is indicative of said corresponding multiple of said corresponding base number;

(d) providing in one-to-one correspondence said plurality of one-hot control signals to a plurality of one-hot multiplexers; and (e) configuring each of said plurality of one-hot multiplexers to select one of a plurality of shifted versions of said significand sum in dependence upon corresponding one-hot control signal.

16. The method of claim 15, wherein said number of leading zeros predicted in step (a) is equal to or one less than actual number of leading zeros in said significand sum.

17. The method of claim 16, further comprising shifting said significand sum one-bit if said predicted number of leading zeros in step(a) is one less than said actual number of leading zeros in said significand sum.

18. The method of claim 15 wherein said prediction in step(a) is performed by a leading zero anticipator.

* * * * *